United States Patent [19]
Roberts

[11] Patent Number: 5,479,463
[45] Date of Patent: Dec. 26, 1995

[54] NEUTRON ABSORBING APPARATUS

[76] Inventor: Paul Roberts, 3057 SE. Waveland Pl., Stuart, Fla. 34996

[21] Appl. No.: 208,866

[22] Filed: Mar. 11, 1994

[51] Int. Cl.$^6$ .................................................. G21C 7/00
[52] U.S. Cl. ..................... 376/339; 376/272; 376/327; 376/449; 376/220
[58] Field of Search .................... 376/272, 339, 376/327, 449, 220; 252/478; 301.6; 926/DIG. 120

[56] References Cited

U.S. PATENT DOCUMENTS

| | | | |
|---|---|---|---|
| 3,781,191 | 12/1973 | Jones | 376/377 |
| 3,917,335 | 11/1975 | Jones | 294/84 A |
| 4,045,283 | 8/1977 | Noyes et al. | 376/239 |
| 4,243,889 | 1/1981 | Weber | 250/507 |
| 4,655,999 | 4/1987 | Maruyama et al. | 376/333 |
| 4,676,948 | 6/1987 | Cearley et al. | 376/333 |
| 4,684,499 | 8/1987 | Gjertsen et al. | 376/446 |
| 4,788,029 | 11/1988 | Kerjean | 376/272 |
| 4,876,060 | 10/1989 | Yoshioka et al. | 376/333 |
| 5,034,185 | 7/1991 | Ueda et al. | 376/333 |
| 5,180,544 | 1/1993 | Yoshioka et al. | 376/333 |
| 5,198,183 | 3/1993 | Newman | 376/272 |
| 5,276,718 | 1/1994 | Ueda | 376/220 |
| 5,339,342 | 8/1994 | Meier et al. | 376/446 |

*Primary Examiner*—Donald P. Walsh
*Assistant Examiner*—Meena Chelliah
*Attorney, Agent, or Firm*—Kevin Redmond

[57] ABSTRACT

A neutron absorbing apparatus which includes two adjacent neutron absorbing plates and a mounting assembly with latching means configured to be easily secured to fuel assemblies while the fuel assemblies remain under water in a fuel storage rack, thereby eliminating the need to remove the fuel assemblies or the fuel storage rack for installation. The two neutron absorbing plates are positioned orthogonally to form a chevron cross section which can be placed about the fuel assemblies by insertion in the existing space between the fuel assemblies and the cell walls of a fuel storage rack. A prescribed orientation of the chevron configured neutron absorbing plate in the cells of the fuel storage rack together with the selected use of a single neutron absorbing plate economically provides sufficient neutron absorption in all radial directions about the fuel assemblies to maintain safe storage conditions in closely packed fuel storage racks.

26 Claims, 3 Drawing Sheets

NEUTRON ABSORBING APPARATUS

Field of the Invention

The present invention generally relates to the apparatus and method used for the close packing of nuclear fuel assemblies and more specifically to a neutron absorber which is attached directly to and partially surrounds a fuel assembly. The means for attachment to the fuel assembly facilitates the installation of the present invention on the fuel assembly while it is stored in an underwater fuel storage rack without the need to remove the fuel assembly or the fuel storage rack.

BACKGROUND

Nuclear power plants are currently required to store their spent fuel assemblies on site. Storage is accomplished by placing the spent fuel assemblies in closely packed fuel storage racks located at the bottom of on site storage pools. To provide maximum storage space, the storage racks contain a large number of adjacent storage cells, each cell being capable of accepting a spent fuel assembly. The walls of the cells include a neutron absorber to avoid critically and to permit the close packing of the nuclear fuel assemblies. This type of storage has been in use for over 15 years and in many sites the neutron absorber in the cell walls has begun to deteriorate. In order to extend the period over which the fuel assemblies may be stored in this manner, it is necessary to either replace the neutron absorber in the cell walls or to add an additional neutron absorber to the cell or the fuel assembly.

Although there are a wide variety of neutron absorbers, as well as methods for their fabrication and installation which theoretically could be applied in this application, there are generally no prior art neutron absorbers or methods capable of permitting on site installation in an economically feasible manner. The economic aspect of the installation of a neutron absorber is one of the most important because the retrofitting of the nuclear fuel storage racks at one site alone can cost tens of millions of dollars. The high cost is due in large measure to the great expense for new storage rack design, fabrication, licensing, and installation, as well as the expense for old rack removal and radioactive waste disposal incurred during this removal.

An example of an economically unsuitable prior art approach which could technically be applied to address the retrofitting process described above is contained in U.S. Pat. No. 4,787,029. In this patent, a fuel rack is described that is designed to store closely packed fuel assemblies. Within this fuel rack, a neutron absorber is encased in the cell walls that surround each spent fuel assembly To apply this fuel rack to a retrofitting application, all the spent fuel assemblies in an old installed rack would first have to be removed and placed in temporary storage. Following this, the old rack would have to be removed and disposed of as radioactive waste. Finally, the new rack would have to be installed and the spent fuel assemblies would then have to be placed in the new storage rack, all at great expense.

A second example of an unsuitable prior art approach for this retrofitting application is provided by U.S. Pat. No. 5,198,183. This patent illustrates a neutron absorber that may be inserted within the fuel assembly itself. The application of the neutron absorber described in this patent is also not economically feasible for retrofitting applications because it would require the steps of retrieval of the spent fuel assemblies from the underwater storage rack, the modification of the fuel assemblies by the installation and locking in place of the neutron absorber within the fuel assembly, and finally the return of the modified fuel assemblies to their cells in the underwater fuel rack, all of which would have to be carried out on site by skilled operators using specialized remotely operated equipment.

A third example of an unsuitable prior art approach for this retrofitting application is provided by a commercially available thick neutron absorber formed of boron carbide in an aluminum matrix. This neutron absorber is typically 0.1 to 0.2 inch thick and is recommended for installation about all four sides of a fuel assembly. This recommendation may be prompted by the relatively poor absorption properties of boron. By specifying the placement of the thick neutron absorber about all four sides of an unmodified fuel assembly, it becomes difficult, if not impossible, to install this absorber while the fuel assembly remains in a storage rack because there is usually insufficient clearance between the fuel assembly and the wall of the storage rack cell to accept such a thick walled neutron absorber. In an attempt to compensate for this problem, it is recommended that the fuel assembly be modified by retrieving it from the storage rack and removing the flow channel to make room for the thick walled absorber. If such a procedure is followed, the user must incur the cost of retrieval of each spent fuel assembly, disposal of the radioactive flow channel, installation of the new neutron absorber and return of the fuel assembly to the fuel rack. In attempting to solve the fuel assembly storage problem, this approach has created another nuclear waste storage and disposal problem which generally cannot be carried out on site.

In addition, the thick walled neutron absorber presents a potential failure mode over its lifetime. This absorber is first fabricated as a single plate which is then folded to have a rectangular cross section. The area in which the fold takes place contains the neutron absorbing material. Microscopic cracks occurring along the line of the fold could later develop into leaks which could reduce the effectiveness of this type of neutron absorber. Unfortunately, this is the exact problem that this absorber was designed to correct.

These and other limitations of the prior art are overcome by the present invention which is described in the following detailed specifications.

SUMMARY OF THE INVENTION

In a preferred embodiment of the present invention, a neutron absorber plate is folded into a chevron cross sectional pattern, enabling the neutron absorber to cover two surfaces of a fuel assembly. Attached to the the top end of the chevron configured neutron absorber plate is a mounting plate adapted to fit over the top of a BWR fuel assembly and be secured to the assembly by means of a latch mounted on the mounting plate. This apparatus containing the neutron absorber plate is lowered into a storage pool where it is guided into position over a cell of the fuel storage rack containing a fuel assembly. The apparatus is then lowered further to insert the chevron configured plate between the cell walls and the fuel assembly.

Clips on the lower end of the neutron absorber plate grip the lower end of the fuel assembly while the latching means on the mounting plate is used to secure the mounting plate to the top of the fuel assembly. The latching means is easily secured to the fuel assembly by tightening a captured screw contained within the latching means. The captured screw is tightened by means of a socket wrench affixed to the end of an extended shaft. The mechanism for lowering the absorber plates is similar to that which is used to place the fuel assemblies in storage. No specially trained personnel with metal working skills or costly equipment is required, nor is there any requirement for the removal or rework of any equipment, such as fuel racks or assemblies.

Multiple absorber plates having the chevron configuration of the present invention are each positioned in their respective cells in the same quadrant in which the first installed absorber plate is placed to provide absorber coverage in all radial directions about the fuel assemblies. The only areas not covered by this orientation of the absorber plates are two outside surfaces of the fuel rack which generally do not require coverage because they face an open water area. The open water serves as the neutron absorber in such cases. However, additional absorber coverage may be provided on these surfaces, if desired, by applying to the outside of the fuel rack a flat plate form of the invention which has been designed for this purpose.

DETAILED DESCRIPTION OF THE INVENTION

To provide a concise and appropriate description, alternative terminology may be employed depending on the context. In particular, a neutron absorbing plate may be alternatively referred to as neutron absorber, or simply as absorber.

Figure 1A:
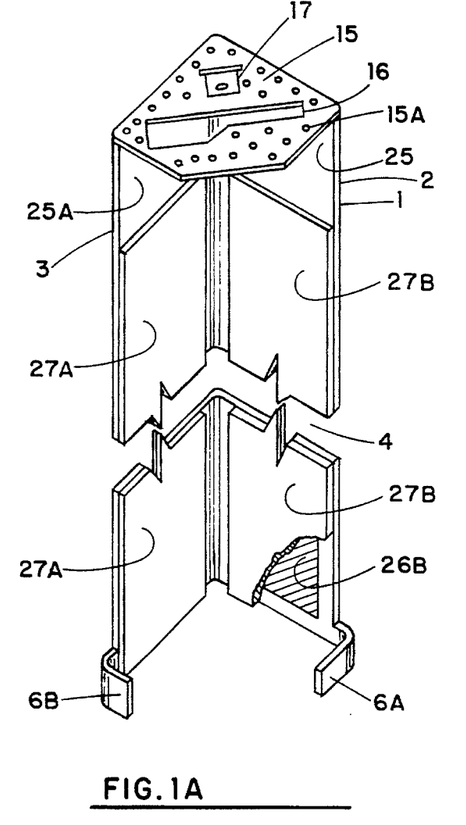
FIG. 1A is a perspective drawing of the present invention.

The perspective view of a preferred embodiment of the invention for use with BWR fuel assemblies illustrated in FIG. 1A shows the invention to comprise a neutron absorber plate 1, a fight lower fuel assembly clip 6A, a left lower fuel assembly clip 6B, a mounting plate 15 with a plurality of flow holes, such as hole 15 A, an aperture 16, and a latch 17. The neutron absorber plates are typically 13 to 14 feet in length, but only 5 inches in width. To conveniently illustrate these plates in FIG. 1A, their midsection has been shown as broken away along the lines at drawing numeral 4. For this configuration, the neutron absorber plate 1 has been folded to form two plates, a right plate 2 and a left plate 3. These plates are positioned generally orthogonal to one another to fit about two sides of the generally rectangular fuel assemblies. The upper ends of these plates are connected to two adjacent outer edges of the mounting plate, while the right and left clips, 6A and 6B are connected to lower ends of the right and left absorber plates respectively. These clips extend outward from the the absorber plates to grip the lower end of the fuel assembly.

The neutron absorber plate is formed of three layers, a backing plate 25, a neutron absorbing sheet, such as sheet 26B, and a cover plate, such as 27B. There is usually a separation 25A on the backing plate between the mounting plate 15 and the top of a cover plate, such as cover plate 27A. There is no need to extend the neutron absorbing sheet 26B to the top of the backing plate because there is no fuel in the fuel assembly in this area. The fabrication and assembly of the invention are described in greater detail in the description of FIG. 6.

Figure 2:
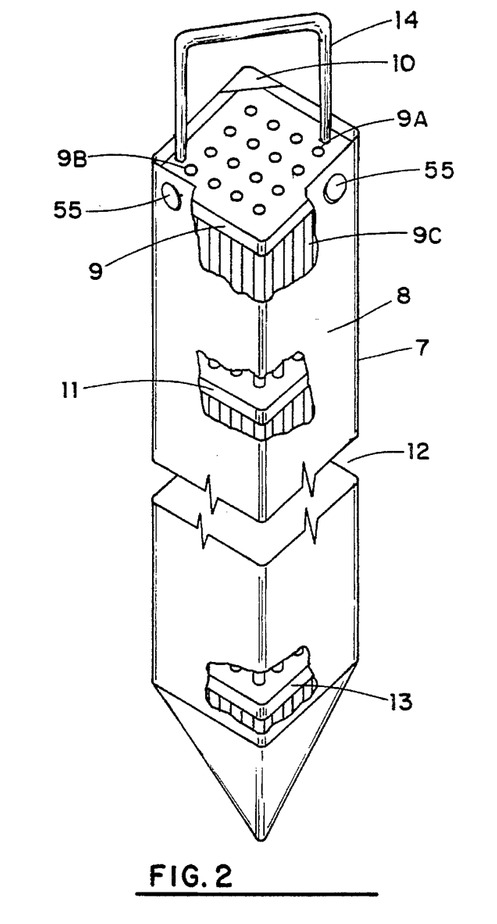
FIG. 2 is a perspective view of a fuel assembly used in a boiling water reactor (BWR) with a flow channel attached.

As has been noted, the configuration of the invention shown in FIG. 1A is referred to as the chevron configuration because of the orthogonal positioning of the absorber plate which has been designed to fit about a generally rectangular fuel assembly, such as the fuel assembly 7 shown in FIG. 2.

The BWR fuel assembly shown in FIG. 2 can be seen to comprise a flow channel 8, an upper fuel tie plate 9 with a plurality of apertures such as 9A and 9B which are designed to accept the upper end of fuel rods, such as fuel rod 9C, a fuel rod interim spacer 11, a lower fuel rod tie plate 13, a bail 14, and a flow channel comer plate 10. Since this fuel assembly has an aspect ratio similar to that of the neutron absorber plate shown in FIG. 1, the midsection of the fuel assembly in FIG. 2 has been shown as broken away at drawing numeral 12 for convenience of illustration.

The basic function of the fuel assembly is to provide a means of conveniently handling a plurality of fuel rods while maintaining a prescribed spacing between the rods. Typically, the fuel rods are oriented parallel to one another and are spaced apart by a distance of approximately ⅜ of an inch. This is accomplished by fastening the rods in apertures, such as 9A and 9B, in the upper tie plate and in similar apertures in the lower tie plate. The bail, which is mounted on the upper surface of the upper tie plate, is used as the principal means of lifting and transporting the fuel assembly about a power station. It is particularly useful in raising and lowering the fuel assembly in and out of the fuel storage rack. The flow channel, which is secured to both the upper and lower tie plates, is used to aid in directing the flow of water about the fuel rods while the fuel assembly is in the reactor core.

The flow channel includes two spacer buttons 55 whose purpose is to provide the proper spacing between adjacent fuel assemblies in the reactor core. These buttons extend generally 0.316 inch outwardly from two sides of the flow channel as can be seen in FIG. 2. The outward extension of these buttons make it difficult to closely fit neutron absorbers about all four sides of the fuel assembly because of the mechanical interference which would occur on the two sides of the fuel assembly containing these spacer buttons. This is a problem with prior art neutron absorber that attempt to cover all four sides without making provision for these buttons. However, the chevron configuration of the present invention shown in FIGS. 1A and 1B covers only two sides of the fuel assembly and can easily accommodate these buttons.

Figure 1B:
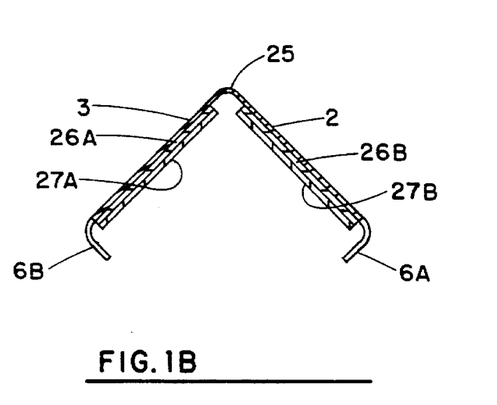
FIG. 1B is a cross sectional view of the present invention.

The orthogonal cross section of the absorber plate in the chevron configuration can be seen in FIG. 1B. This Figure is a plan view of the present invention with the upper section removed to clearly show the orthogonal orientation of the right and left absorber plates. This cross sectional view shows the location of the neutron absorber sheets 26A and 26B, covering plates 27A and 27B, and backing plate 25. This Figure also shows lower end mounting clips 6A and 6B located at the lower end of the absorber plate. When the invention is in place about a fuel assembly, these clips extend about the lower end of the flow channel to hold the lower end of the invention to the fuel assembly. The upper end of the invention for BWR fuel assemblies is secured to the fuel assembly by means of the latch 17 which can be seen in FIG. 1A secured to the upper surface of the mounting plate.

Figure 3:
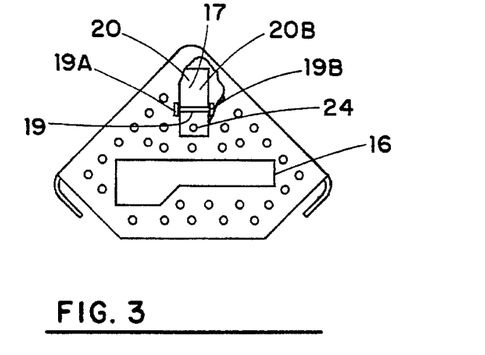
FIG. 3 is a plan view of the mounting plate of the present invention.
Figure 4A:
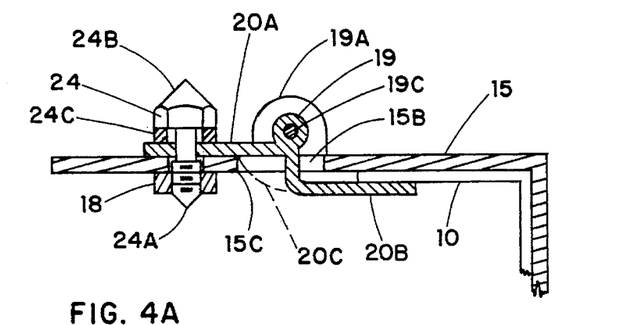
FIG. 4A is a cross sectional view of the latching mechanism for a BWR fuel assembly attached to the mounted plate of the present invention.

The latch is shown in greater detail in FIGS. 3 and 4A. FIG. 3 is a plan view of the mounting plate 15, showing the latch 17 and its principal components, a captured screw 24, a hinge 19 and a tongue 20. The hinge rotatably connects the tongue to the mounting plate. The hinge includes trunnions 19A and 19B. The point of rotation is shown more clearly in the side view of the latch provided by FIG. 4A. In this Figure, the latch tongue is cross hatched from upper left to lower right to distinguish it from the mounting plate, which is cross hatched in the opposite direction, upper right to lower left. The tongue passes through an aperture 15B in the mounting plate where the hinge connects the tongue to the cover plate. FIG. 4A shows the details of one embodiment of the hinge. In this embodiment, the hinge comprises a cylindrical port 19C passing through the tongue to accept the two trunnions 19A and 19B, only one of which, 19A, is shown in this Figure. The trunnions are disposed on either side of the tongue and are attached to the mounting plate 15. Cylindrical projections on the trunnions extend into the cylindrical port in the tongue, rotatably supporting it and providing it with the ability to rotate with respect to the mounting plate.

The tongue's cross section is in the form of a reversed "S" which allows the upper portion of the tongue 20A to be located above the mounting plate, while the lower portion 20B is located below the mounting plate. The lower portion of the tongue, when in its latched position as shown in FIG. 4A, extends beneath the corner plate 10 of the flow channel, securing the invention to the fuel assembly. The tongue is maintained in its latching position by means of a captured screw 24 and a nut 18. The captured screw 24 is attached to the upper portion of the tongue 20A, while the nut 18 is attached to the bottom of the mounting plate in a position to receive screw 24. The screw 24 is threaded into the nut, enabling it to hold the upper portion of the tongue down on the mounting plate and thereby preventing the lower portion of the tongue from releasing the corner plate.

The lower tip 24A of screw 24 is conical to aid in guiding it into the nut 18. The head of the screw 24B is also conical to aid in guiding a socket wrench on to the screw head. Typically, a socket wrench attached to a long shall is guided onto the screw head and the screw is tightened down onto the cover plate manually from the top of the storage pool. The use of specialized personnel or tools is completely avoided.

Prior to lowering the the invention down onto a fuel assembly, the tongue must be oriented generally vertically to enable it to later close on the corner plate. The tongue is maintained in this vertical position by means of a slight compression occurring between the tongue and the edge of aperture 15C, as indicated by the path of rotation 20C of the lower portion 20B of the tongue. This path results in a slight interference fit for the tongue as it rotates to a vertical position through aperture 15B. Once the invention is in position on the fuel assembly, the socket wrench can be moved manually by way of the attached shaft to tap the latch past this interference point and into position where the captured screw may be tightened down, forcing the tongue down flush onto the mounting plate.

A captured lock washer 24C is located just below the screw head and above the upper portion of the tongue. As the screw is tightened down, it is locked in place by this washer. There is rarely any vibration occurring in the storage pools, but this feature is an added safety factor designed to provide an extra margin of safety to protect against such event, even though they may be rare.

Figure 4B:
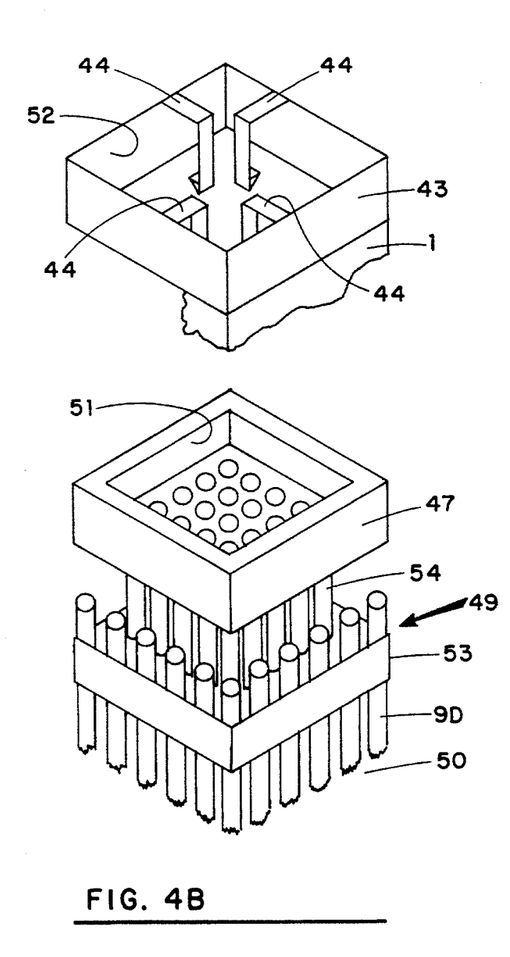
FIG. 4B is a prospective view of a fuel assembly used in a pressurized water reactor (PWR) and an embodiment of the present invention designed to be attached to this type of fuel assembly.

The configuration of a PWR fuel assembly differs from that of a BWR fuel assembly and accordingly requires a different embodiment of the present invention to provide a convenient means of attachment to the PWR fuel assembly. The differences in the two types of fuel assemblies lies primarily in the components forming their upper and lower end fittings and the absence of a flow channel in the PWR fuel assembly. A PWR fuel assembly 49 is shown in FIG. 4B. Since the means for attachment of the invention described herein is made to the upper end of the PWR fuel assembly, only the the upper end of the PWR fuel assembly is shown in this Figure. The lower portion of this fuel assembly is deleted below point 50. The primary components of the upper end of the PRW fuel assembly comprise a flow nozzle 47, a plurality of fuel rods, such as rod 9D, a plurality of guide tubes, such as guide tube 54, and spacer grids, such as spacer grid 53. The guide tubes are attached to the nozzle 47 and also attached to the spacer grid 53. The connection between the spacer grid and the guide tubes occurs within the fuel assembly. The spacer grid extends inward from the periphery of the fuel assembly where it is shown in FIG. 4B, passing about the fuel rods to reach the guide tubes. The fuel rods are connected to and supported in position by the spacer grid.

The nozzle 47, which is located on the top of the fuel assembly, has a rectangular outer perimeter, conforming generally to the outer perimeter of the fuel assembly. This nozzle also includes a rectangular inner aperture 51, which is centrally located and is symmetrically positioned with respect to the outer perimeter. This aperture produces a nozzle that is in the form of a rectangular wall which is approximately one-half inch thick.

The means for attachment to the PWR fuel assembly is illustrated in the embodiment of the invention shown in the upper portion of FIG. 4B. This embodiment comprises an absorber plate 1, a rectangular sleeve 43, and four upper attachment clips 44. The sleeve is formed about a rectangular aperture 52 which is sufficiently wide to fit closely about the fuel assembly nozzle 47.

Figure 4C:
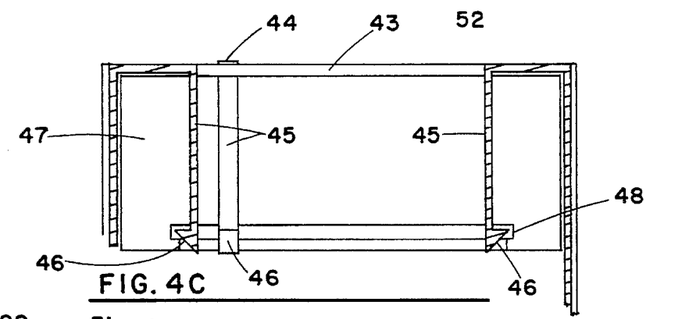
FIG. 4C is a cross sectional view of the upper nozzle of a PWR fuel assembly and the latching mechanism designed for use with this type of fuel assembly.

The upper attachment clips are shown in detail in FIG. 4C. These clips comprise arms 45 and retaining tips 46. The arms are connected to the top of the sleeve and extend over the top of the nozzle and then downward inside the aperture 51 to a depth where the nozzle contains a recess 48. At this depth, the the arms of the clips terminate in the retaining tips 46. As can be seen in FIG. 4C, the retaining tips have a triangular cross section, with one of the orthogonal sides aligned with the clip arm and the other extending beneath the collar recess to secure the invention to the fuel assembly.

This means of attachment can also be applied while the fuel assembly is in storage. As the invention is lowered about the fuel assembly, the hypotenuse of the retaining clips acts as a cam to force the arms of the clips sufficiently towards the center of aperture 52 to allow the the clips to pass down into the aperture 51 until the recess 48 has been reached. The arms of the clips 44 are resilient and cause the tips to extend tinder the recess once they have reach the depth of the recess. The clips may be released by use of a special tool to force them back into the aperture and out from under the recess.

Figure 7:
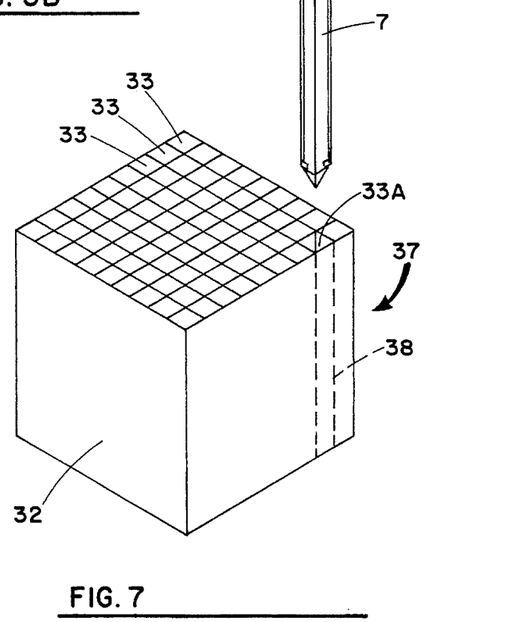
FIG. 7 is a fuel storage rack showing the location of the fuel storage cells in the rack and the path for the insertion of a fuel assembly into one of the cells.

As shown in FIG. 7, a fuel assembly 7 with the invention attached is typically stored in a storage rack 37 that is normally located in a 40 foot deep pool. The fuel storage rack consists of a generally rectangular outer wall 32 within which the internal volume is divided into a series of small rectangular cells such as cells 33. When placing a fuel assembly into storage, the fuel assembly, such as assembly 7 is lowered down into a cell such as 33A to occupy the volume in the fuel rack showed by projection lines 38. In FIG. 7, the fuel assembly 7 has been foreshortened for illustrative purposes. The height of the fuel assembly is approximately the same as that of the fuel rack. The fuel assembly essentially occupies the total volume of the cell, with the exception of a clearance space between the fuel assembly and the cell walls which is used to to permit the insertion of the present invention about the fuel assembly while it remains in storage in a fuel rack.

Figure 8:
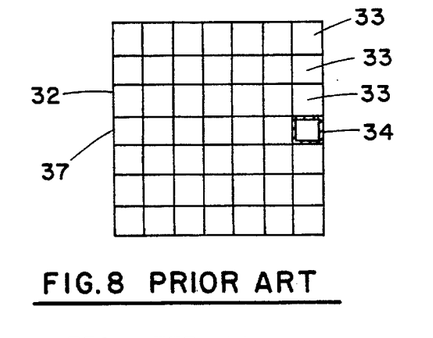
FIG. 8A is a plan view of a fuel storage rack containing prior art neutron absorbing sheets located in the side walls of the cells.
FIG. 8B is a detailed cross sectional view of one cell of a fuel storage rack showing the prior art neutron absorber as well as the location of the present invention within this cell.

In most currently used fuel racks, all four walls of the fuel cell contained neutron absorber plates. FIG. 8A shows a plan view representation of the cells in a fuel rack 37. This rack consists of the outer wall 32, a plurality of cells 33 with all four walls of the cells containing absorber plates. For illustrative purposes, the location of the absorber plates in the cell walls is shown in this Figure by the darkened peripheral area in cell 34. These are the absorber plates that are now corroding and are losing their effectiveness as neutron absorbers, requiring replacement by means such as the present invention.

Figure 8B:
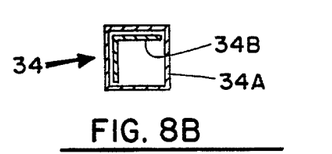

Cell 34 is shown more clearly in the larger drawing of this cell presented in FIG. 8B. This cell is formed of four walls, such as wall 34A, containing the existing, but often depleted neutron absorbing material. This cell also includes a cross sectional view of the chevron configuration of the invention, 34B as it would normally be positioned in such a cell.

Figure 9:
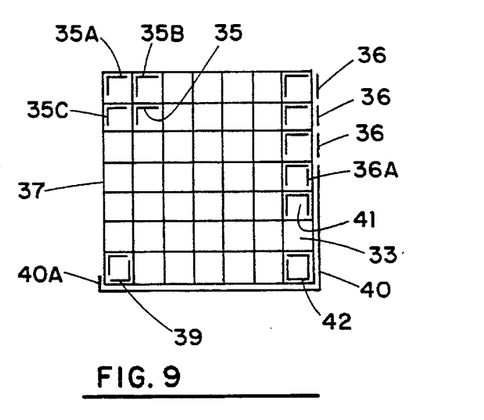
FIG. 9 is a plan view of a fuel storage rack containing the neutron absorbing apparatus of the present invention in a prescribed order and orientation to provide absorption in all radial directions that is sufficient to avoid criticallity.

The chevron configuration of the present invention, which ordinarily protect only two sides of the fuel assembly, can be oriented to protect all four sides of the fuel assembly by using the proper orientation of the absorber plates in the fuel rack. This orientation is illustrated in FIG. 9 where a fuel storage rack 37 is shown holding a number of fuel assemblies with the present invention secured to each fuel assembly. The orientation and general location of the absorber plates of the invention is represented by a chevron, such as chevron 35. A chevron is drawn in each cell containing the invention. In this Figure, each chevron is oriented to protect the upper and the left wall of its respective cell.

Three contiguous cells containing three chevron configured absorber plates 35A, 35B, and 35C with the same orientation, completely protect all four sides of the cell containing absorber plates 35A. The upper and left wall of the cell containing absorber plates 35A are protected by absorber plates 35A. The left plate from chevron plates 35B protects the right wall of the cell containing 35A and the upper plate from chevron plates 35C protects the lower wall of this cell. Continuing the same orientation through out the entire fuel rack will provide protection of all four wall of all cells with the exception of the the right and lower outside walls of the fuel storage rack. Neutron absorber plates can be generally omitted from these walls because they face open water which is itself a neutron absorber.

However, if additional protection is desired, additional neutron absorbing plates can be added to these outside walls in several ways. A first way is to add a series of absorber plates along the outside wall such as plates 36 which are shown positioned along the right outside wall in FIG. 9. A second way is to add a single, large absorber plate, such as plate 40, to protect one or two walls of the storage rack. A third way is to use two of the chevron absorber plates per fuel cell to protect all four walls within a cell as shown in cell 39. This arrangement may be applied to any cell as necessary to increase neutron absorption, but in most instances it can be restricted to use only along the right and lower wall in FIG. 8 for cost savings purposes. The relatively thin wall of the present invention makes this more feasible than is possible with prior art thick wall absorbers.

Figure 5B:
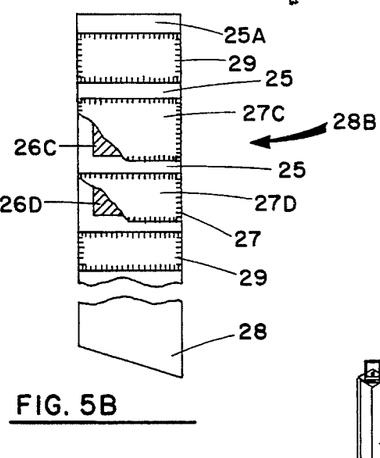
FIG. 5B is a view of a single plate neutron absorber plate for use in the present invention.
Figure 6:
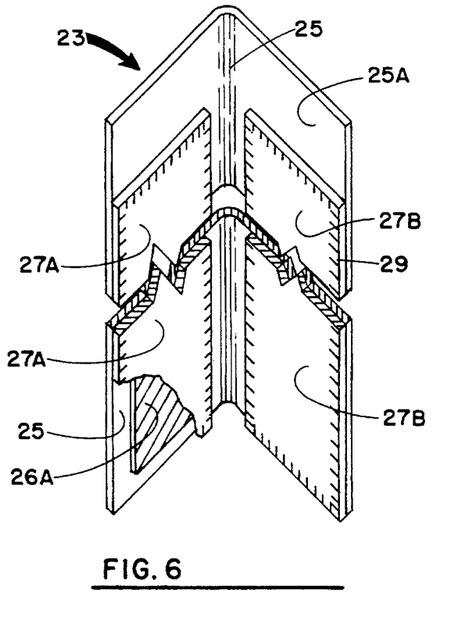
FIG. 6 is a perspective view of a neutron absorber plate after folding into the chevron cross sectional configuration for use in the present invention.

In order to describe other alternate ways of providing neutron absorber protection that can be use along the outside wall of the fuel rack, it is necessary to briefly consider alternative configurations of the invention. Although the chevron configuration is the preferred configuration of the present invention, as will be shown in greater detail below, the invention may be fabricated as a single plate absorber, such as shown in FIG. 5B, as a double plate absorber, such as shown in FIG. 6, as a triple plate absorber, such as shown in cell 41 of FIG. 9, as a quadruple plate absorber, such as shown in cell 42, and as a large plate absorber such as plate 40 of FIG. 9.

These various configurations of the invention may be applied in different ways to achieve additional neutron absorber protection for the outside walls of the fuel rack. For example, further cost savings may be obtained by using a fourth way of protecting this wall in which the single absorber plate form of the present invention is attached to the fuel assembly and positioned within a cell against an outside wall as shown by the location of the single plate absorber 36A in FIG. 9. The addition of a single plate to the chevron configuration in effect produces a triple plate absorber. A triple plate absorber may be fabricated directly and installed as shown in cell 41 of FIG. 9 to produce the same results. In cell 42 of FIG. 9 outside protection of all four walls of the cell is required if in addition to the upper and left walls both the right and lower outside walls of the fuel rack are to be protected. If the protection is to be obtained from absorber plates within the cell, either the quadruple plate configuration shown in this cell or a combination of the previously described plate configurations can be used. An advantage of using absorber plates within the cell is they are relatively easily installed. These plates can be secured to the mounting plate of the invention in any desired configuration and installed in the same manner as previously described for the chevron configuration.

Applying absorber plates to the outside of fuel storage racks can be somewhat more difficult than installing plates within the cell as described above, but it is feasible and constitutes a fifth way to protect the fuel rack wall. This way is feasible because the outside walls are relatively accessible. They face open water within the storage pool, providing ample room to maneuver absorber plates and tools required for the installation of the absorber plates. The absorber plates may be installed on a fuel storage rack without removal of either the fuel assemblies or the fuel storage rack. The edges of these absorber plates incorporate projections that are designed to grip the the walls of the fuel storage rack, as shown in FIG. 9 by edge projection 40A on plate 40. This edge projection extends about the corner contour of the fuel rack to provide a lip that grips the fuel rack. Such edge projections reduce the required number of conventional securing means, such as screws and tapped holes, that are required to be placed in the fuel rack, thereby reducing the amount of under water machining operations.

Figure 5A:
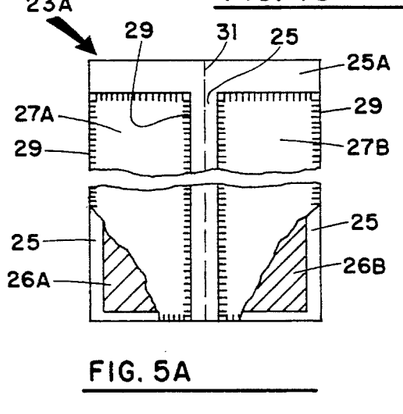
FIG. 5A is a view of the neutron absorbing plate forming the side walls of the present invention shown prior to its being folded into a chevron cross sectional configuration.

The internal features of the absorber plates used in the present invention are shown in FIG. 5A. In this Figure, the plates are shown as being flat because they are initially fabricated from flat plate material which is later folded into the chew on configuration shown in FIG. 6. In FIG. 5A, an absorber plate assembly 23 A comprises a backing plate 25, a first neutron absorbing sheet 26A, a second neutron absorbing sheet 26B, a first cover plate 27A, and a second cover plate 27B. The backing and cover plates are made of a material such as stainless steel or aluminum having a thickness ranging between 0.020 and 0.050 inches. These materials are selected to prevent corrosion of the neutron absorbing sheet which would otherwise occur because of contact with the water in the storage pool. The neutron absorbing sheet is made of a neutron absorbing material such as cadmium having a thickness ranging between 0.004 and 0.040 inches. The cover plates are separated from each other to expose an area located generally in the middle of the backing plate about dashed line 31 along which the backing plate is later folded into the chevron configuration shown in FIG. 6.

Cadmium is the preferred material for the neutron absorbing sheet because it provides a high level of neutron absorption even when used in sheets that are only 0.004 to 0.040 inch thick. However, the invention is not limited to the use of cadmium. Other materials such as borated stainless steel and boron in a ceramic matrix may serve as the neutron absorbing material in this invention.

The first and second neutron absorbing sheets are smaller than the cover plates and are positioned so that they are centered beneath the first and second cover plates, respectively. This positioning of the neutron absorbing sheets provides an area along the edges of the cover plates, indicated by dashed line 29, for sealing the neutron absorbing sheets between the cover plates and the backing plate. Along these edges, the cover plates lie directly over the backing plate without an intervening neutron absorbing sheet. The cover plates are joined to the backing plate in this area by means of a process, such as seam welding, which provides a seal that protects the neutron absorber sheets from the corrosive action of the water in the storage pool.

As shown in FIG. 5 A there are two distinct absorber plates spaced apart and supported in this position by a single backing plate which is folded after seam welding of the cover plates to form the chevron configuration. Typically, there is a space 25A between the top of the cover plate and the top of the backing plate because there is no fuel in this area of the fuel assembly. There are a number of distinct advantages to this method of fabrication. The first advantage is this method avoids a major problem encountered with prior art processes where there is no area free of a cover plate or neutron absorber sheet. Unless special, costly precautions are taken, the folding of the backing plate in the area where it is not free of a cover plate would cause buckling and possibly cracks which would in turn leave the absorber sheet exposed. In the present invention, there is no cover plate nor neutron absorber sheet in the area in which the backing plate is folded, permitting the backing plate to be folded easily without concern for damaging the seal about the neutron absorber sheet. This features provides a significant cost saving during fabrication and increases the reliability of the neutron absorber plate.

Another significant cost saving advantage is gained by this method of fabrication because a fast, low cost process such as seam welding can be used for sealing the neutron absorber sheet. The invention is first fabricated using readily available flat sheet material. While the invention is still in flat form, it is seam welded at low cost with standard, readily available equipment. It is then folded without damage, again by means of standard low cost readily available equipment. In some previously used processes, tubes with circular cross sections or rectangular cross sections were required to be welded. Such cross sections made it difficult or impossible to use low cost processes such as seam welding.

FIG. 5B shows a single plate absorber 23B in accordance with the present invention. This absorber plate is fabricated in the same way as the invention shown in FIG. 5A with the exception that it is designed to cover only one side of a fuel assembly. This absorber plate can be used in such applications as the single plate absorber 36A shown in FIG. 9 or wherever additional neutron absorption is required, such as on the side of a fuel assembly. The absorber plate shown in FIG. 5B has two additional features, not shown in FIG. 5A. The first is the neutron absorber sheet is divided into two or more segments such as segments 26C and 26D as is the cover plate, such as segments 27C and 27D. There is space between these segments that exposes the backing plate 25. The segments of the cover plate are sealed to protect the corresponding segments of the neutron absorbing. The segmenting and individual sealing of the segmented portions of the neutron absorbing sheet in this way permits the absorbing sheet to be cut between the welded seals of the individual segments to provide various lengths of absorber plate in the field. The second feature is the angled lower end of the absorber plate leading to a tip 28. Although there is usually room to fit within a cell of a fuel storage rack the present invention attached to a fuel assembly, there are occasions when the fuel assembly may be warped. A single absorber plate can be maneuvered more easily than a two plate assembly and may be able to be pressed by a tight fitting area with the aid of the angled lower end.

As noted above, it is usually possible to provide protection in four radial directions with the chevron configuration and it is also possible in most instances to insert the chevron configuration into a cell of a fuel storage rack while attached to a fuel assembly. This is possible because the chevron configuration covers only two sides of the fuel assembly, leaving ample room for insertion by avoiding the use of all the; clearance space on all four sides of the fuel assembly. These important advantages make the chevron configuration the preferred embodiment of the present invention. Although the three plate or four plate configurations may on occasion be more difficult to insert into a fuel storage cell, they can be employed to serve as necessary in the special applications noted above.

Three and four plate absorber can be fabricated using the same process described above. The number of sides dictates the width of the backing plate, the number of absorber sheets and the number of cover plates. Once sealed by welding or other appropriate means, the flat plate is folded in three to form a three sided or "U" cross section or into four to form a rectangular cross section, as required to produce the desired cross section.

Prior art absorber plates in many instances tried to completely encircle the fuel assembly with the absorber medium because it was not known what discontinuities in the coverage of the absorber medium could be tolerated and still avoid criticallity. Computers with large storage capacities are more readily available now and have been used to determine this information. It has been determined that the small discontinuities in the absorber plates at the fold in the backing plate and at the outside edges of the right and left absorber plates can be easily tolerated, permitting the use of the present invention to provide the desired neutron absorption protection as shown and described.

Having described my invention, I claim:

1. A neutron absorbing apparatus for external application to a BWR fuel assembly of the type incorporating a flow channel and having a longitudinal axis, a generally rectangular cross section lying in a plane orthogonal to said longitudinal axis, an upper and a lower end with each of said ends lying in separate planes that are generally orthogonal to said longitudinal axis, and four sides with each side generally extending from one side of the upper end to a corresponding side of the lower end and running generally parallel to said longitudinal axis, a fuel rod affixed to and located within said fuel assembly and oriented generally parallel to said longitudinal axis, a bail affixed to and extending outwardly from said upper end and oriented generally parallel to said longitudinal axis, a triangular corner plate lying in a plane generally orthogonal to said longitudinal axis with the edges along two of its triangular sides aligned with and attached to two edges of one corner of the fuel assembly at said upper end of the fuel assembly, said neutron absorbing apparatus comprising:

(a) a mounting plate having a generally rectangular cross section and a size generally equal to that of said upper end of the neutron absorbing apparatus, said mounting plate being oriented in a plane generally orthogonal to said longitudinal axis and being positioned immediately above and in generally alignment with said upper end of the neutron absorbing apparatus, said mounting plate including a first and a second aperture, said first aperture being aligned with and being of sufficient magnitude to pass said bail, (b) a tongue rotatably mounted to said mounting plate and located in said second aperture in said mounting plate, said tongue having a first and a second end and said tongue being positioned to set the first end of the tongue beneath the corner plate to secure said neutron absorbing apparatus to said fuel assembly, (c) means for detachably securing the second end of the tongue to the mounting plate to latch said first end of the tongue beneath said corner plate, (d) a first backing plate positioned generally parallel to and generally covering a first side of said four sides of the fuel assembly, said first backing plate having an upper and a lower end, the upper end of said first backing plate being connected to a first edge of the mounting plate, (e) a first neutron absorbing sheet having a size smaller than the first backing plate and being positioned against the first backing plate on the side facing the fuel assembly, (f) a first cover plate having a size larger than the neutron absorbing sheet to completely cover the neutron absorbing sheet, said first cover plate being positioned over and against the first neutron absorbing sheet and lying between the first neutron absorbing sheet and the fuel assembly, and (g) means for attaching the first cover plate generally about its edges to the first backing plate to provide a protective enclosure about the first neutron absorbing sheet with one of said edges of the first cover plate running in the aggregate parallel to said longitudinal axis.

2. A neutron absorbing apparatus as claimed in claim 1 wherein said means for attaching the first cover plate to said first backing plate extends along all the edges about the first cover plate and one of said edges is positioned in the aggregate generally parallel with said longitudinal axis.

3. A neutron absorbing apparatus as claimed in claim 1, further comprising means for constraining said tongue in a position generally orthogonal to said mounting plate, said means for constraining being actuated to constrain said tongue when said tongue is placed by means of an applied force in a direction generally orthogonal to said mounting plate and said means for releasing said tongue from constraint when said tongue is placed by means of an applied force in a direction generally parallel to said mounting plate.

4. A neutron absorbing apparatus as claimed in claim 2 wherein said means for constraining includes an interference contact between said mounting plate and said tongue, said interference contact being encountered when said tongue is placed in a position generally orthogonal to said mounting plate.

5. A neutron absorbing apparatus as claimed in claim 1, further comprising:

(a) a second backing plate positioned generally parallel to and generally covering a second side of the fuel assembly, said second backing plate having an upper and a lower end, the upper end of the second backing plate being connected to a second edge of the mounting plate, (b) a second neutron absorbing sheet having a size smaller than the second backing plate and being positioned against the second backing plate on the side facing the fuel assembly, (c) a second cover plate having a size larger than the second neutron absorbing sheet to completely cover the second neutron absorbing sheet, said second cover plate being positioned over and against the second neutron absorbing sheet and lying between the the second neutron absorbing sheet and the fuel assembly, and (d) means for attaching the second cover plate to the second backing plate to provide a protective enclosure about the second neutron absorbing sheet.

6. A neutron absorbing apparatus as claimed in claim 5 wherein said first and second backing plates cover adjacent sides of the fuel assembly and further comprising means for joining the adjacent edges of the first and second backing plates to form a chevron configuration in a cross section of the first and second backing plates taken in a plane orthogonal to said longitudinal axis.

7. A neutron absorbing apparatus as claimed in claim 6, further comprising a first projection of resilient material extending from the lower end of said first backing plate along the edge located opposite the edge joined to the second backing plate, said first projection extending in a direction to lie against a third side of the fuel assembly adjacent said first side of the fuel assembly to secure the lower end of said neutron absorbing apparatus to said fuel assembly.

8. A neutron absorbing apparatus as claimed in claim 7, further comprising a second projection of resilient material extending from the lower end of said second backing plate along the edge located opposite the edge joined to the second backing plate, said second projection extending in a direction to lie against a fourth side of the fuel assembly adjacent said second side of the fuel assembly to secure the lower end of said neutron absorber to the fuel assembly.

9. A neutron absorbing apparatus for external application to a BWR fuel assembly of the type having a longitudinal axis, a generally rectangular cross section lying in a plane orthogonal to said longitudinal axis, an upper and a lower end with each of said ends lying in separate planes that are generally orthogonal to said longitudinal axis, and four sides with each side generally extending from one side of the upper end to a corresponding side of the lower end and running generally parallel to said longitudinal axis, a fuel rod affixed to and located within said fuel assembly and oriented generally parallel to said longitudinal axis, a bail affixed to and extending outwardly from said upper end of the fuel assembly and oriented generally parallel to said longitudinal axis, said neutron absorbing apparatus comprising:

(a) a mounting plate oriented in a plane generally orthogonal to said longitudinal axis and positioned immediately above and in general alignment with said upper end of the fuel assembly, (b) means for detachably securing the mounting plate to the fuel assembly, (c) a first backing plate generally parallel to and generally covering a first side of said four sides of the fuel assembly, said first backing plate having an upper and a lower end, the upper end of the first backing plate being connected to a first edge of the mounting plate, (d) a first neutron absorbing sheet having a size smaller than the first backing plate and being positioned against the first backing plate on the side facing the fuel assembly, (e) a first cover plate having a size larger than the first neutron absorbing sheet to enable it to completely cover the first neutron absorbing sheet, said first cover plate being positioned over and against the first neutron absorbing sheet and lying between the first neutron absorbing sheet and the fuel assembly, and (f) means for attaching the cover plate to the first backing plate to provide a protective enclosure about the first neutron absorbing sheet with a segment of said means for attaching running generally parallel in the aggregate with said longitudinal axis.

10. A neutron absorbing apparatus as claimed in claim 9, wherein said BWR fuel assembly incorporates a flow channel which forms the outer covering of the upper end and all four sides of the fuel assembly, the fuel assembly being of the type that includes a triangular corner plate lying in a plane generally orthogonal to said longitudinal axis with the edges along two of its triangular sides being aligned with and attached to two edges of one corner of said upper end of the fuel assembly, and wherein said means for securing the mounting plate to said upper end of the fuel assembly comprises a tongue rotatably mounted to said mounting plate and located in said second aperture in said mounting plate, said tongue having a first and a second end and said tongue being positioned to set the first end of the tongue beneath the corner plate to secure the neutron absorbing apparatus to said fuel assembly.

11. A neutron absorbing apparatus as claimed in claim 9, further comprising:

(a) a second backing plate positioned generally parallel to and generally covering a second side of the fuel assembly, said second backing plate having an upper and a lower end, the upper end of the second backing plate being connected to a second edge of the mounting plate, (b) a second neutron absorbing sheet having a size smaller that the second backing plate and being positioned against the second backing plate on the side facing the fuel assembly, (c) a second cover plate having a size larger than the second neutron absorbing sheet to completely cover the second neutron absorbing sheet, said second cover plate being positioned over and against the second neutron absorbing sheet and lying between the second neutron absorbing sheet and the fuel assembly, and (d) means for attaching the second cover plate to the second backing plate to provide a protective enclosure about the second neutron absorbing sheet.

12. A neutron absorbing apparatus as claimed in claim 9, wherein said neutron absorbing sheet includes a sheet of cadmium having a thickness between 0.004 and 0.040 inch and said first backing plate and first cover plate each individually have a thickness between 0.02 and 0.05 inch.

13. A neutron absorbing apparatus as claimed in claim 9, wherein said neutron absorbing sheet contains boron.

14. Apparatus as claimed in claim 12, wherein said first and second backing plate and said first and second cover plate are formed of aluminum.

15. Apparatus as claimed in claim 12, wherein said first and second backing plate and said first and second cover plate are formed of stainless steel.

16. A neutron absorbing apparatus for external application to a PWR fuel assembly, said fuel assembly being of the type having a longitudinal axis, a generally rectangular cross section lying in a plane orthogonal to said longitudinal axis, an upper and a lower end with each of said ends lying in separate planes generally orthogonal to said longitudinal axis, and four sides with each side generally extending from one side of the upper end to a corresponding side of the lower end and running generally parallel to said longitudinal axis, a fuel rod affixed to and located within said fuel assembly and oriented generally parallel to said longitudinal axis, a PWR nozzle affixed to and generally covering said upper end of the PWR fuel assembly and lying in a plane generally orthogonal to said longitudinal axis, said PWR nozzle having an aperture centrally located about said longitudinal axis and said aperture passing through said PWR nozzle in the direction of said longitudinal axis, said PWR nozzle including a recess in said aperture lying in a plane generally orthogonal to said longitudinal axis, said neutron absorbing apparatus comprising:

(a) a sleeve having an aperture, said aperture having a cross sectional size sufficient to pass closely about said nozzle, said sleeve having an upper and a lower end and said sleeve being positioned to surround said sleeve with said upper end of the PWR nozzle being set to be generally aligned with the upper end of said PWR nozzle, (b) a first arm attached to the upper end of said sleeve and extending down within the aperture in said PWR nozzle to engage the recess in said aperture in said PWR nozzle to secure the neutron absorbing apparatus to the PWR fuel assembly, (c) a first backing plate positioned generally parallel to and generally covering a first side of said four sides of the fuel assembly, said first backing plate having an upper and a lower end, the upper end of said first backing plate being connected to a first segment of the edge of said sleeve along the lower end of said sleeve, (d) a first neutron absorbing sheet having a size smaller than the first backing plate and being positioned against the first backing plate on the side facing the fuel assembly, (e) a first cover plate having a size larger than the neutron absorbing sheet to completely cover the neutron absorbing sheet, said first cover plate being positioned over and against the first neutron absorbing sheet and lying between the first neutron absorbing sheet and the fuel assembly, and (g) means for attaching the first cover plate generally about its edges to the first backing plate to provide a protective enclosure about the neutron absorbing sheet with one of the edges of the first cover plate running in the aggregate generally parallel to said longitudinal axis.

17. A neutron absorbing apparatus as claimed in claim 16 further comprising a second a third and a fourth arm, each arm being attached to the upper end of said sleeve and extending down within the aperture in said PWR nozzle to engage the recess in said aperture to secure said neutron absorbing apparatus to said PWR fuel assembly.

18. A neutron absorbing apparatus as claimed in claim 16, further comprising:

(a) a second backing plate positioned generally parallel to and generally covering a second side of said four sides of the fuel assembly, said second backing plate having an upper and a lower end, the upper end of said second backing plate being connected to a second segment of the edge of said sleeve along its lower end, (b) a second neutron absorbing sheet having a size smaller than the second backing plate and being positioned against the second backing plate on the side facing the fuel assembly, (c) a second cover plate having a size larger than the second neutron absorbing sheet to completely cover the second neutron absorbing sheet, said second cover plate being positioned over and against the second neutron absorbing sheet and lying between the the second neutron absorbing sheet and the fuel assembly, and (d) means for attaching the second cover plate to the second backing plate to provide a protective enclosure about the second neutron absorbing sheet.

19. A neutron absorbing apparatus as claimed in claim 18 wherein said first and second backing plates cover adjacent sides of the fuel assembly and further comprising means for joining the adjacent edges of the first and second backing plates to form a chevron configuration in a cross section of the first and second backing plates taken in a plane orthogonal to said longitudinal axis.

20. A method for producing a neutron absorbing apparatus, comprising the steps of:

(a) providing a first flat sheet of neutron absorbing material and a first and a second flat metal plate, the flat metal plates being generally of similar shape and larger in area than the area of the first (cadmium) sheet of flat neutron absorbing material to enable the first and second flat metal plates to completely cover the first (cadmium) sheet of neutron absorbing material, (b) placing the first flat (cadmium) sheet of neutron absorbing material between the first and second flat metal plates with (the) said plates being generally aligned with one another and with the first flat (cadmium) sheet of neutron absorbing material being generally centrally located between (the) said metal plates to completely cover the first flat (cadmium) sheet of neutron absorbing material with (the) said metal plates, and (c) welding the periphery of (the) said metal plates to join them and seal the first flat (cadmium) sheet of neutron absorbing material between the two metal plates.

21. A method as claimed in claim 20 wherein said welding is seam welding and said neutron absorbing material is a first sheet of cadmium.

22. A method for producing a neutron absorbing apparatus as claimed in claim 21, further comprising the steps of:

(a) providing a second sheet of cadmium and providing said first metal plate with an area larger than the combined areas of the first and second cadmium sheets to enable the first metal plate to completely cover the first and second cadmium sheets, (b) providing a third metal plate with an area larger than said second cadmium sheet to enable said third metal plate to completely cover said second cadmium sheet, (c) placing the first and second cadmium sheets on the first metal sheet with no portion of the first and second cadmium sheets extending beyond the edges of the first metal sheet and placing the second metal sheet over the first cadmium sheet to completely cover the first cadmium sheet and placing the third metal plate over the second cadmium sheet to completely cover the second cadmium sheet, said second and third metal plates being positioned apart from one another, and (d) welding the periphery of the second and third metal plates to the first metal plate to seal the first cadmium sheet within an enclosure formed of the first and second metal plates and to seal the second cadmium sheet within an enclosure formed of the first and third metal plates.

23. A method as claimed in claim 22 wherein said welding is seam welding.

24. A method for producing a neutron absorbing apparatus as claimed in claim 22, further comprising the step of folding the first metal plate in the area between the second and third metal plates.

25. A method for producing a neutron absorbing apparatus as claimed in claim 24, further comprising the step of folding the first metal plate between the second and third metal plates to produce a chevron cross section in the first metal plate.

26. A method of producing a neutron absorbing apparatus as claimed in claim 22, further comprising the steps of cutting the first metal plate in the area between the second and third metal plates to produce neutron absorbers of the size generally of the second and third metal plates.

* * * * *